United States Patent
Uratani et al.

(10) Patent No.: US 7,464,235 B2
(45) Date of Patent: Dec. 9, 2008

(54) STORAGE SYSTEM AND CONTROL METHOD THEREOF, AND COMPUTER PROGRAM PRODUCT

(75) Inventors: Ikuo Uratani, Kaisei (JP); Kiichiro Urabe, Isehara (JP)

(73) Assignee: Hitachi, Ltd., Tokyo (JP)

( * ) Notice: Subject to any disclaimer, the term of this patent is extended or adjusted under 35 U.S.C. 154(b) by 365 days.

(21) Appl. No.: 11/256,154

(22) Filed: Oct. 24, 2005

(65) Prior Publication Data
US 2007/0050575 A1    Mar. 1, 2007

(30) Foreign Application Priority Data
Sep. 1, 2005    (JP)  ............................ P2005-253874

(51) Int. Cl.
*G06F 12/06* (2006.01)
(52) U.S. Cl. ............................. 711/162; 711/114; 714/4
(58) Field of Classification Search ................. 711/161, 711/114, 112, 202, 203, 205, 206; 714/6, 714/4
See application file for complete search history.

(56) References Cited

U.S. PATENT DOCUMENTS

| | | | | |
|---|---|---|---|---|
| 5,592,618 A | * | 1/1997 | Micka et al. ................. | 711/162 |
| 5,974,503 A | * | 10/1999 | Venkatesh et al. ............ | 711/114 |
| 6,216,211 B1 | * | 4/2001 | McBrearty et al. ........... | 711/162 |
| 6,625,750 B1 | * | 9/2003 | Duso et al. ...................... | 714/4 |
| 7,146,526 B2 | * | 12/2006 | Tomita ............................ | 714/6 |
| 2006/0259722 A1 | * | 11/2006 | Watanabe ..................... | 711/162 |

FOREIGN PATENT DOCUMENTS

JP    2005-044199    7/2003
JP    2005-107645    9/2003

OTHER PUBLICATIONS

Christodoulakis et al. "Data organization and storage hierarchies in a multimedia server," IEEE, 1993.*
Jadav et al. Design & Evaluation of Data Access Strategies in a High Performance Multimedia-on-Demand Server. IEEE 1995.*

* cited by examiner

*Primary Examiner*—Pierre-Michel Bataille
(74) *Attorney, Agent, or Firm*—Reed Smith LLP; Stanley P. Fisher, Esq.; Juan Carlos A. Marquez, Esq.

(57) ABSTRACT

Provided is a storage system having a host system, a first storage controller and a second storage controller. The first storage controller has a primary logical volume formed from an actual volume, and a secondary logical volume formed from a virtual volume capable of forming a copy pair with the primary logical volume. The second storage controller has an external volume formed from an actual volume to be mapped to the secondary logical volume. The host system has device data showing the mapping relationship between the external volume and the secondary logical volume.

12 Claims, 13 Drawing Sheets

EXTERNAL DEVICE INFORMATION

| VDEV | DEVICE IDENTIFYING INFORMATION | CAPACITY (KB) | DEVICE TYPE | PATH INFORMATION | |
|---|---|---|---|---|---|
| | | | | WWN | LUN |
| 0 | DRFGTFNEIEK | 657,456 | DISK | 0xAABBCCDD | 0 |
| 1 | ADRFGTFNEIE | 89,854 | DISK | 0xAABBEEFF | 3 |
| 2 | GGRRFFDDERT | — | TAPE | 0x445566AAB | 5 |
| 3 | AABBCCDDEE | 5,544223 | DISK | 0x77DE12345 | 6 |
| | | | | 0x77DE12345 | 3 |
| | | | | 0x377DE7890 | 5 |

310

| COPY SOURCE LU | COPY DESTINATION LU | PAIR STATUS |
|---|---|---|
| LU#1 | LU#11 | PAIR CREATE |
| LU#2 | LU#12 | PAIR SPLIT |
| LU#3 | LU#13 | RESYNCHRONIZATION |

FIG. 10

```
HORCM_MON
#ip_addresss    service    poll(10ms)    timeout(10ms)
localhost       30100      100           3000

HORCM_CMD
#dev_name       dev_name   dev_name
/dev/sdg

HORCM_DEV
#dev_group      dev_name   port#         TargetID    LU#    MU#
horc0           dev00      cl1-e-0       0           1
horc0           dev01      cl2-e-0       0           8

HORCM_INST
#dev_group      ip_addresss    service
horc0           localhost      30101
```

36

STORAGE SYSTEM AND CONTROL METHOD THEREOF, AND COMPUTER PROGRAM PRODUCT

CROSS-REFERENCES TO RELATED APPLICATIONS

This application relates to and claims priority from Japanese Patent Application No. 2005-253874, filed on Sep. 1, 2005, the entire disclosure of which is incorporated herein by reference.

BACKGROUND

The present invention relates to a storage system and control method thereof, and a computer program product.

With a database system that handles enormous amounts of data such as in a data center, data is managed with a storage system such as a disk array system. A disk array device is configured by arranging numerous storage devices in an array and provides the host system with a storage resource in a RAID (Redundant Array of Independent Inexpensive Disks) configuration. The host system and storage system are mutually connected via a device-sharing network such as a SAN (Storage Area Network). As one operation mode of a storage system, Japanese Patent Laid-Open Publication No. 2005-44199 proposes technology of forming a pair among a plurality of volumes distributed and arranged via a network, and performing copies among the volumes. Further, as another operation mode of a storage system, Japanese Patent Laid-Open Publication No. 2005-107645 proposes technology of virtualizing the external storage resource existing outside the storage controller as an internal storage resource so as to seek the effective use of storage resource.

SUMMARY

Meanwhile, the present inventors are considering an operation mode of forming, in a storage system formed by connecting a first storage controller and a second storage controller, a copy pair between a primary logical volume (actual volume) of the first storage controller and a secondary logical volume (virtual volume), and mapping the actual volume of the second storage controller to the secondary logical volume of the first storage controller. Since the actual volume of the second storage controller exists outside the first storage controller, for convenience of explanation, this will be referred to as an external volume.

With this kind of operation mode, in order to back up the data in the external volume of the second storage controller in a tape library or the like, or to restore the backup data stored in a tape library or the like to the external volume, as the preprocessing thereof, it is necessary to perform a pair split to the copy pair of the first storage controller or perform a cache flush to the cache memory of the first storage controller in order to prevent the inflow of data from the secondary logical volume into the external volume.

Conventionally, however, since the backup server that performed the backup or restoration of data in the external volume of the second storage controller did not have a means for acquiring mapping information which shows the mapping relationship between the secondary logical volume of the first storage controller and the external volume of the second storage controller, it was not able to perform the appropriate pair split to the copy pair in the first storage controller or perform cache flush to the cache memory of the first storage controller as the preprocessing for performing the backup or restoration of the external volume.

Further, when a pair split is erroneously performed to a copy pair with no mapping relationship with the external volume to be subject to the backup or restoration of data, there is a problem in that the backup or restoration of data in the external volume cannot be conducted normally.

Thus, an object of the present invention is to overcome the foregoing problems by appropriately controlling the first storage controller upon giving consideration to the mapping relationship between the first storage controller and the second storage controller.

In order to achieve the foregoing object, the storage system of the present invention has a host system, a first storage controller and a second storage controller. The first storage controller has a primary logical volume formed from an actual volume, and a secondary logical volume formed from a virtual volume capable of forming a copy pair with the primary logical volume. The second storage controller has an external volume formed from an actual volume to be mapped to the secondary logical volume. The host system has device data showing the mapping relationship between the external volume and the secondary logical volume.

Since the host system is retaining device data showing the mapping relationship of the external volume and secondary logical volume, it is possible to appropriately control the first storage controller upon giving consideration to the mapping relationship between the first storage controller and the second storage controller.

As a preferred mode of the present invention, the host system determines the mapping relationship between the external volume and the secondary logical volume by referring to the device data upon performing backup or restoration of the external volume and, when it is determined that the external volume is being mapped to the secondary logical volume, transmits to the first storage controller a command designating a pair split of the secondary logical volume to which the external volume is mapped and the primary logical volume.

Since the host system is able to designate the pair split of the copy pair to the first storage controller upon determining the mapping relationship between the external volume and secondary logical volume based on the device data, it is possible to prevent the erroneous designation of a pair split.

In a preferred mode of the present invention, the first storage controller further has a cache memory for temporarily storing data to be read from and written into the secondary logical volume. The host system determines the mapping relationship between the external volume and the secondary logical volume by referring to the device data upon performing backup or restoration of the external volume and, when it is determined that the external volume is being mapped to the secondary logical volume, transmits to the first storage controller a command designating a cache flush of a cache memory for temporarily storing data to be read from and written into the secondary logical volume to which the external volume is mapped.

Since the host system is able to designate a cache flush to the first storage controller upon determining the mapping relationship between the external volume and secondary logical volume based on the device data, it is possible to prevent the inflow of data from the second logical volume into the external volume during the backup or restoration of the external volume.

In a preferred mode of the present invention, a plurality of host systems exist. When any host system among the plurality of host systems is designated to perform the backup or restoration of an external volume and this external volume is not an external volume managed by the host system that received the designation, by the host system that received the designation referring to another host system, another host system managing the external volume, on behalf of the host system that received the designation, transmits to the first storage controller a command designating a pair split of the secondary logical volume to which the external volume is mapped and the primary logical volume.

According to the foregoing configuration, even when the external volume subject to backup or restoration is not under the control of a host system that received the designation of performing the backup or restoration of the external volume, the host system having the external volume under its own control is able to designate a pair split to the first storage controller by the host systems referring to each other via mutual communication.

In a preferred mode of the present invention, a plurality of host systems exists. When any host system among the plurality of host systems is designated to perform the backup or restoration of the external volume and the external volume is not an external volume managed by the host system that received the designation, by the host system that received the designation referring to another host system, another host system managing the external volume, on behalf of the host system that received the designation, transmits to the first storage controller a command designating a cache flush of a cache memory for temporarily storing data to be read from and written into the secondary logical volume to which the external volume is mapped.

According to the foregoing configuration, even when the external volume subject to backup or restoration is not under the control of a host system that received the designation of performing the backup or restoration of the external volume, the host system having the external volume under its own control is able to designate a cache flush to the first storage controller by the host systems referring to each other via mutual communication.

The storage system applying the control method of the present invention includes a first storage controller having a primary logical volume formed from an actual volume and a secondary logical volume formed from a virtual volume capable of forming a copy pair with the primary logical volume, and a second storage controlling having an external volume formed from an actual volume to be mapped to the secondary logical volume.

The control method of the present invention has the steps of: determining the mapping relationship between the external volume and the secondary logical volume upon performing the backup or restoration of the external volume; and when it is determined that the external volume is being mapped to the secondary logical volume, transmitting to the first storage controller a command designating a pair split of the secondary logical volume to which the external volume is mapped and the primary logical volume.

The control method pertaining to another mode of the present invention has the steps of: determining the mapping relationship between the external volume and the secondary logical volume upon performing the backup or restoration of the external volume; and when it is determined that the external volume is being mapped to the secondary logical volume, transmitting to the first storage controller a command designating a cache flush of a cache memory for temporarily storing data to be read from and written into the secondary logical volume to which the external volume is mapped.

The computer program product of the present invention has a computer program for causing the host system to execute the control method of the present invention. This computer program, for instance, may be stored in a memory inside the host system, or may be stored in a recording medium. As such recording medium, for example, the likes of an optical recording medium (a recording medium capable of optically reading data such as a CD-RAM, CD-ROM, DVD-RW, DVD-ROM, DVD-R, PD disk, MD disk or MO disk), a magnetic recording medium (a recording medium capable of magnetically reading data such as a flexible disk, magnetic card or magnetic tape) or a memory element (a semiconductor memory element such as a DRAM or a ferroelectric memory element such as an FRAM) may be used.

According to the present invention, the host system is able to appropriately control the first storage controller upon giving consideration to the mapping relationship between the first storage controller and second storage controller.

DESCRIPTION OF THE DRAWINGS

FIG. 4 is a mapping table storing information for mapping an external volume of the second storage controller to a secondary logical volume of the first storage controller;

FIG. 10 is an explanatory diagram of a configuration file with configuration information of the first storage controller described therein;

DETAILED DESCRIPTION

Embodiments of the present invention are now explained with reference to the respective drawings. The respective embodiments do not limit the scope of the claims, and features explained in the embodiments are not all necessarily required as means for solving the problems of the present invention.

Embodiment 1

Figure 1:
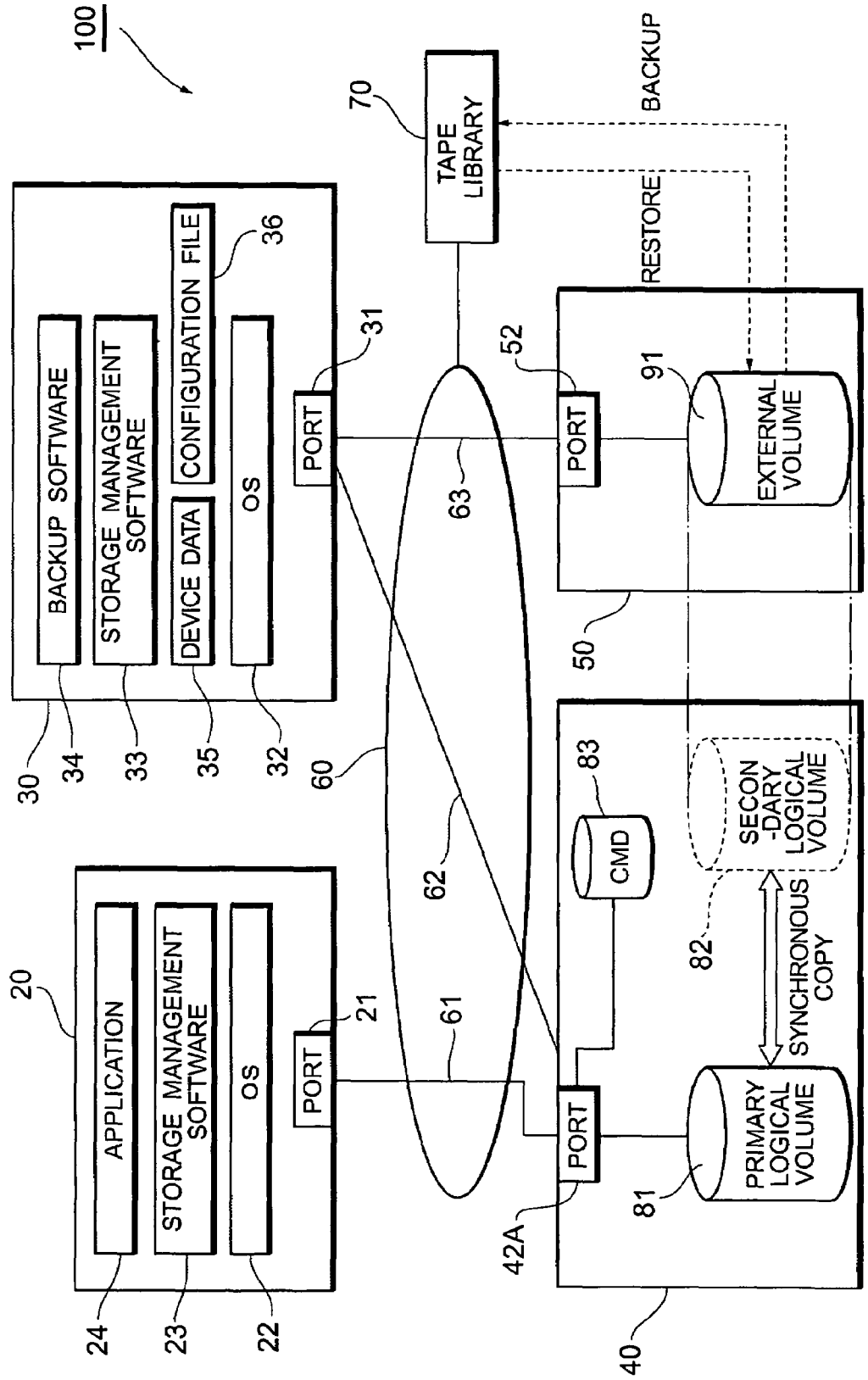
FIG. 1 is a system configuration of the storage system pertaining to Embodiment 1.

FIG. 1 shows the system configuration of a storage system 100 pertaining to the present embodiment. The storage system 100 has a business server 20, a backup server 30, a first storage controller 40 and a second storage controller 50.

The business server 20, backup server 30, first storage controller 40, second storage controller 50 and tape library 70 are mutually connected via a network 60. As the network 60, for instance, a SAN (Storage Area Network), LAN (Local Area Network), Internet, dedicated line, public line and so on may be used. When the network 60 is a LAN, the business server 20 is able to request the input and output of data in file units to the first storage controller 40 based on a TCP/IP. When the network 60 is a SAN, the business server 20 is able to request the input and output of data in block units to the first controller 40 based on a fibre channel protocol.

The first storage controller 40 has a primary logical volume (primary volume) 81 formed from an actual volume and a secondary logical volume (secondary volume) 82 formed from a virtual volume. The primary logical volume 81 and secondary logical volume 82 are able to form a copy pair via synchronous copy. In response to the write access from the business server 20, the first storage controller 40 reports the write complete to the business server 20 after completing the writing of same data in the primary logical volume 81 and secondary logical volume 82 (more precisely, after completing the writing of write data in the cache memory).

The first storage controller 40 further has a target port 42A and a CMD (Command Device) 83. The target port 42A is a network component for the first storage controller 40 to communicate with the business server 20 and backup server 30. The CMD 83 is a logical unit dedicated to transferring commands and statuses between the backup server 30 and first storage controller 40. A command transmitted from the backup server 30 to the first storage controller 40 is written in the CMD 83. The first storage controller 40 executes processing in response to the command written in the CMD 83, and writes the executed results as the status in the CMD 83. The backup server 30 reads and confirms the status written in the CMD 83, and writes the command to be subsequently executed in the CMD 83. Like this, the backup server 30 is able to give various instructions to the first storage controller 40.

Incidentally, as the first storage controller 40, a storage system such as a disk array system may be used, or a virtualization switch which in itself will become a SCSI (Small Computer System Interface) target may also be used.

The second storage controller 50 has an external volume 91 formed from an actual volume. Although the external volume 91 is referred to as an external volume as a matter of convenience since it exists outside when viewed from the first storage controller 40, it is also an internal volume in the sense that it exists inside the second storage controller 50. The external volume 91 is mapped to the secondary logical volume 82 of the first storage controller 40. Mapping is the association of the address space of a plurality of devices. The first storage controller 40 is able to incorporate the external volume 91 as its own internal volume, and provide the storage area thereof to the business server 20.

The second storage controller 50 further has a target port 52. The target port 52 is a network component for the second storage controller 50 to communicate with the backup server 30.

The business server 20 is a business host system to be used in the ATM system of banks and the seat reservation system of airline companies. The business server 20, for instance, is a workstation, mainframe, personal computer or the like. The business server 20 has a port 21, an operating system 22, storage management software (RAID manager) 23 and application software 24. The port 21 is a network component for the business server 20 to communicate with the first storage controller 40. The storage management software 23 manages the storage resource of the first storage controller 40. As the application software 24, for example, database software, Web application software, streaming application software, E-business application software and so on may be used.

The backup server 30 is a host system for backing up the data in the external volume 91 of the second storage controller 50 in the tape library 70, or restoring the backup data stored in the tape library 70 to the external volume 91. The backup server 30 has a port 31, an operating system 32, storage management software (RAID manager) 33 and backup software 34. The port 31 is a network component for the backup server 30 to communicate with the first storage controller 40 and second storage controller 50.

The storage management software 33 manages the storage resource of the first storage controller 40 and second storage controller 50. The storage management software 33 retains device data 35 and a configuration file 36. The device data 35 is a data structure including mapping information showing the mapping relationship of the external volume 91 and secondary logical volume 82. Configuration information of the first storage controller 40 is described in the configuration file 36. Details regarding the device data 35 and configuration file 36 will be described later. The backup software 34 controls the backup and restoration of the external volume 91.

Incidentally, a storage administrator may set the access authority of the business server 20 or backup server 30 by introducing methods such as SAN zoning or LUN masking to the network 60. For example, the port 21 and target port 42A are connected via an access path 61. The port 31 and target port 42A are connected via an access path 62. The port 31 and target port 52 are connected via an access path 63.

When the network 60 is a LAN, a LAN-compatible network card is employed as the ports 21, 31. When the network 60 is a SAN, an HBA (Host Bus Adapter) is employed as the port 21, 31.

Incidentally, in the present embodiment, although shown is a case where there is one first storage controller 40 and one second storage controller 50, respectively, as a matter of convenience for explanation, a plurality of such controllers 40, 50 may exist, respectively. Further, a plurality of primary logical volumes 81, secondary logical volumes 82 and external volumes 91 may also exist, respectively.

Figure 2:
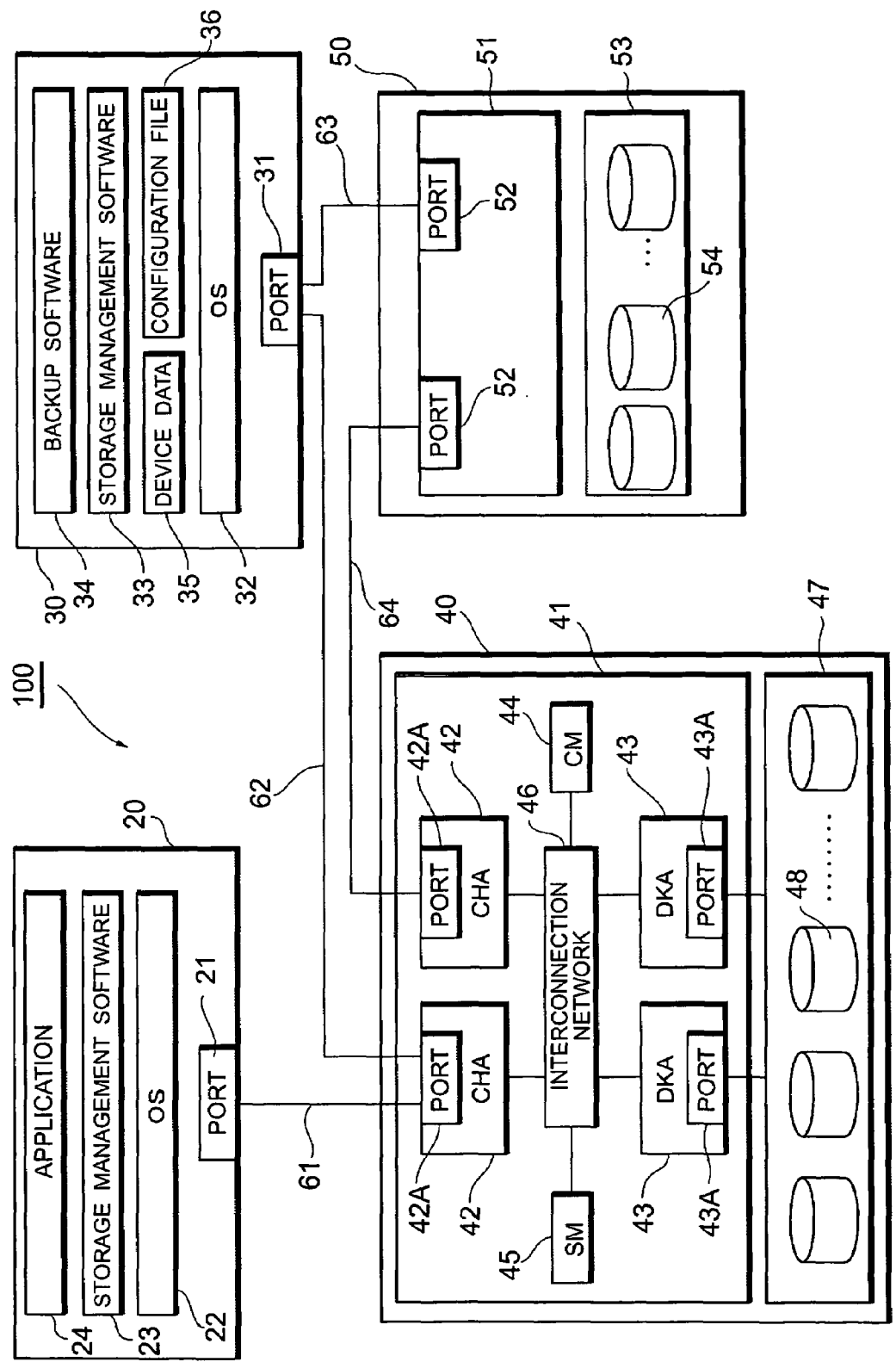
FIG. 2 is a detailed configuration of the storage system pertaining to Embodiment 1.

FIG. 2 shows the detailed configuration of the storage system 100 pertaining to the present embodiment. As a matter of convenience for explanation, illustration of the tape library 70 is omitted. Components having the same reference numeral as those depicted in FIG. 1 indicate the same components, and the detailed explanation thereof is omitted.

The first storage controller 40 has a controller 41 and a storage apparatus 47. The controller 41 has a plurality of channel adapters (CHA) 42, a plurality of disk adapters (DKA) 43, a cache memory (CM) 44, a shared memory (SM) 45, and an interconnection network 46. The storage apparatus 47 has a plurality of physical devices 48.

Each channel adapter 42 is configured as a microcomputer system having the likes of a CPU and memory, and performs data communication with the business server 20 and backup server 30. The channel adapter 42 has a target port 42A and an external port 42B. Each channel adapter 42 is assigned a unique network address and may individually function as a NAS (Network Attached Storage). As the network address, the likes of an IP address or WWN (World Wide Name) may be used. When a plurality of business servers 20 or backup servers 30 exist, each channel adapter 42 individually accepts and processes the requests from the respective business servers 20 or backup servers 30.

Each disk adapter 43 is configured as a microcomputer having the likes of a CPU and memory, and controls the reading and writing of data from and to the physical device 48. The disk adapter 43 has a port 43A for inputting and outputting data to and from the physical device 48. Each disk adapter 43, for instance, writes the data that the channel adapter 42 received from the business server 20 into a prescribed address of a prescribed physical device 48. Further, each disk adapter 43 transmits the data read from the prescribed physical device 48 to the business server 20. Each disk adapter 43 converts the logical address into a physical address when reading and writing data from and to the physical device 48. When the physical device 48 is managed according to a RAID configuration, each disk adapter 43 performs data access according to such RAID configuration. For example, each disk adapter 43 writes the same data into separate physical device groups (RAID groups), or performs parity operation and writes data and parity data into the physical device group.

The cache memory 44 temporarily stores the data received from the business server 20, or temporarily stores the data read from the physical device 48.

The shared memory 45 stores configuration information (for instance, the mapping table 300, copy pair management table 310, address conversion table 320, address conversion table 330 described later) of the first storage controller 40.

Incidentally, any one or more physical devices 48 may be used as a cache disk. Further, the cache memory 44 and shared memory 45 may be configured as separate memories, or a storage area of a part of the same memory may be used as the cache area, and the other area may be used as the control area.

The interconnection network 46 mutually connects the respective channel adapters 42, respective disk adapters 43, cache memory 44 and shared memory 45. The interconnection network 46, for instance, is a high speed bus such as an ultra high speed crossbar switch for performing data transmission based on high speed switching operations.

The physical device 48, for example, is a memory device with an actual storage area such as a hard disk drive, flexible disk drive, magnetic tape drive, semiconductor memory drive, optical disk drive or the like. Further, as the hard disk drive, for instance, a plurality of disk drives having different performance characteristics such as a fibre channel disk drive, serial ATA (Advanced Technology Attachment) disk drive, parallel ATA disk drive, SCSI disk drive and the like may be used, or one type of disk drive among such disk drives may be used.

The second storage controller 50 has a controller 51 and a storage apparatus 53. The detail configuration of the controller 51 is the same as the detailed configuration of the controller 41 described above. The storage apparatus 53 has a plurality of physical devices 54. Further, the external port 42B and target port 52 are connected via an access path 64.

Figure 3:
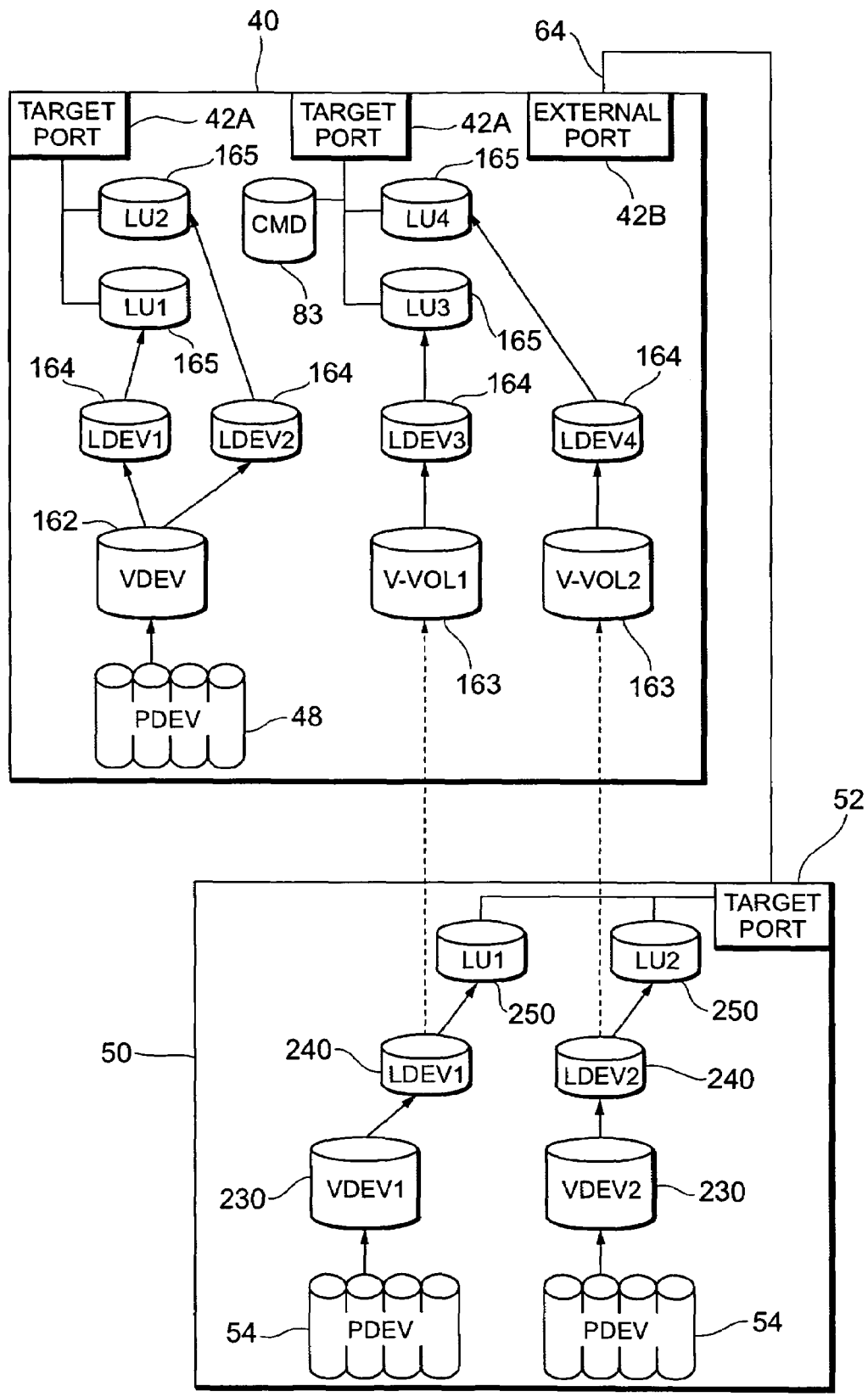
FIG. 3 is an explanatory diagram of a storage hierarchy configured in the first storage controller and second storage controller, respectively.

FIG. 3 shows the storage hierarchy created in the respective storage controllers. The storage hierarchy created in the first storage controller 40 can be broadly classified into a physical storage hierarchy and a logical storage hierarchy. The physical storage hierarchy is configured from the physical device 48.

A logical storage hierarchy may be configured from a plurality of (for example, two types of) hierarchies. One logical hierarchy may be configured from a VDEV (Virtual Device) 162 and a virtual VDEV (hereinafter also referred to as a "V-VOL") 163 treated as a VDEV 162. The other logical hierarchy may be configured from a LDEV (Logical Device) 164.

The VDEV 162, for example, is configured by grouping a prescribed number of physical devices 48, such as in a set of fours (3D+1P), or a set of eights (7D+1P). In other words, the storage areas provided respectively from the plurality of physical devices 48 belonging to the group are assembled to form a single RAID storage area, and this RAID storage area becomes the VDEV 162.

Meanwhile, in contrast to the VDEV 162 being created on the physical device 48, the V-VOL 163 is a virtual intermediate storage device that does not require a physical storage area. The V-VOL 163 is not directly associated with a physical storage area, and is a virtual existence to become the receiver for mapping an LU (Logical Unit) of the second storage controller 50.

At least one or more LDEVs 164 may be provided on the VDEV 162 or V-VOL 163. The LDEV 164, for instance, may be configured by dividing the VDEV 162 in a fixed length. When the business server 20 is an open system, by the LDEV 164 being mapped with the LU 165, the business server 20 will recognize the LDEV 164 as a single physical device. The business server 20 can access a desired LDEV 164 by designating the LUN (Logical Unit Number) or logical block address. Incidentally, when the business server 20 is a mainframe system, the business server 20 will directly recognize the LDEV 164.

The LU 165 is a logical storage unit that is recognized by the business server 20. For instance, if the business server 20 is a UNIX (registered trademark) system, the LU 165 is associated with a device file. Or, if the business server 20 is a Windows (registered trademark) system, the LU 165 is associated with a drive letter (drive name). Each LU 165 is connected to the business server 20 via the target port 42A. At least one or more LDEVs 164 may be respectively mapped to each LU 165. As a result of mapping a plurality of LDEVs 164 to a single LU 165, the LU size can be virtually expanded.

The second storage controller 50 has a plurality of physical devices 54, a VDEV 230 set on the storage area provided by the physical device 54, and at least one or more LDEVs 240 capable of being set on the VDEV 230. The LDEV 240 is mapped to the LU 250. LU 250 (i.e., LDEV 240) is mapped to a V-VOL 163, which is a virtual intermediate storage device, and may also be used from the first storage controller 40.

For example, the "LDEV 1", "LDEV 2" of the second storage controller 50 are respectively mapped to the "V-VOL 1", "V-VOL 2" of the first storage controller 40 via the "LU 1", "LU 2" of the second storage controller 50. And, "V-VOL 1", "V-VOL2" are respectively mapped to the "LDEV 3", "LDEV 4", and respectively provided to the business server 20 as the "LU 3", "LU 4".

Incidentally, the VDEV 162 and V-VOL 163 may adopt the RAID configuration. In other words, a single physical device 48 may be assigned to a plurality of VDEVs 162, V-VOLs 163 (slicing), and a single VDEV 162, V-VOL 163 may be formed from a plurality of physical devices 48 (striping).

The "LDEV 1" or "LDEV 2" of the first storage controller 40 corresponds to the primary logical volume 81 depicted in FIG. 1. The "LDEV 3" or "LDEV 4" of the first storage controller 40 corresponds to secondary logical volume 82 depicted in FIG. 1. The "LDEV 1" or "LDEV 2" of the second storage controller 50 corresponds to the external volume 91 depicted in FIG. 1.

FIG. 4 shows a mapping table 300 storing mapping information for mapping the external volume 91 to the secondary logical volume 82. The mapping table 300 is configured by respectively associating the VDEV number for respectively identifying the VDE162, V-VOL 163, and the information of an external physical device 54 (external device information).

The external device, for instance, may be configured by including the device identifying information, memory capacity of the physical device 54, information showing type of physical device 54 (for instance, tape device/disk device), and path information to the physical device 54. Path information is constituted by including unique identifying information (WWN) of the respective ports 52 and the LUN for identifying the LU 250.

Incidentally, the device identifying information and WWN shown in FIG. 4 are values used as a matter of convenience for explanation, and do not correspond to the configuration illustrated in the other diagrams.

Figures 5, 6:
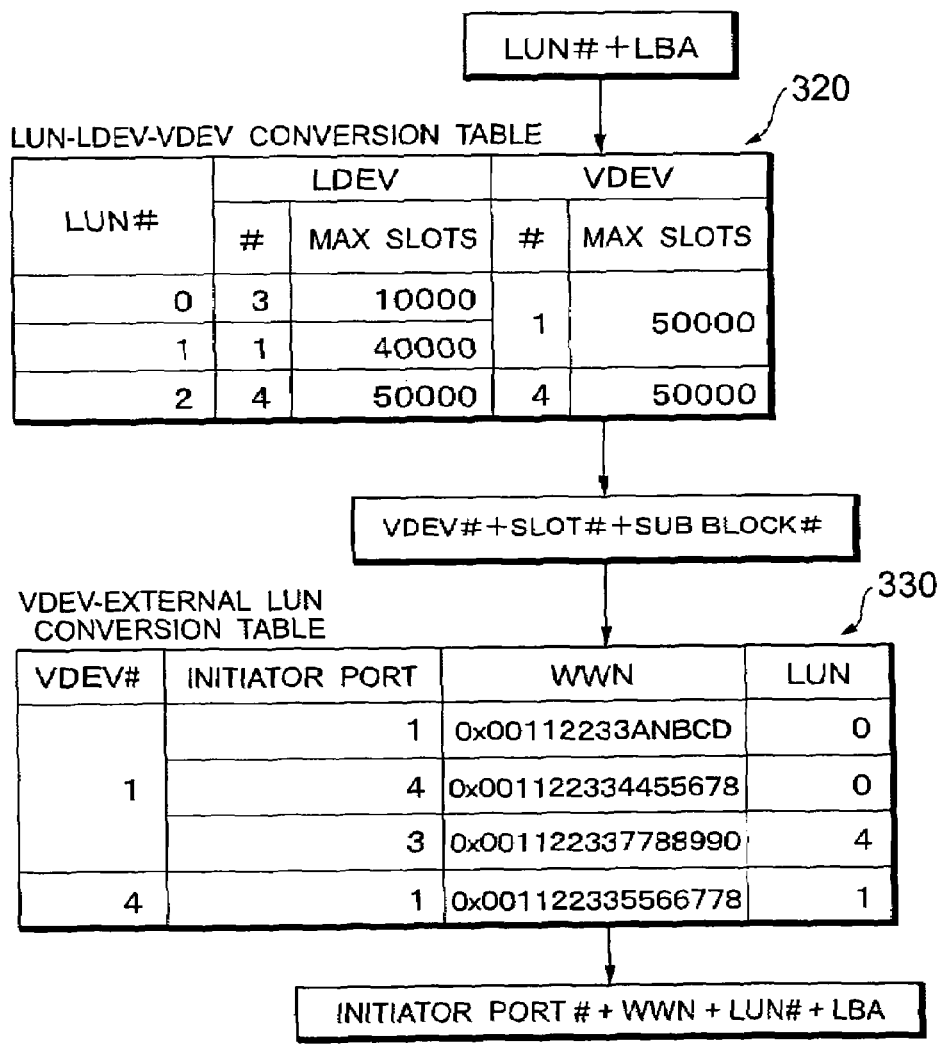
FIG. 5 is an explanatory diagram of a copy pair management table retained in the first storage controller.
FIG. 6 is an explanatory diagram of the address conversion for performing synchronous copy.

FIG. 5 shows a copy pair management table 310 retained by the first storage controller 40. The copy pair management table 310 is configured by associating the information (e.g., LUN) for specifying the copy source LU, information (e.g., LUN) for specifying the copy destination LU, and the current pair status. As the pair status, for instance, "pair create", "pair split", "pair resync" and so on may be considered.

The "pair create" status shows a state where the initial copy (all copy) from the copy source volume to the copy destination volume is conducted to create a copy pair. The "pair split" status shows a state where the copy source volume and copy destination volume are separated after the copy pair is synchronized. The "pair resync" status shows a state where the storage content of the copy source volume and copy destination volume in a separated state are resynchronized once again to create a copy pair.

The first storage controller 40 manages the pair status between the primary logical volume 81 and secondary logical volume 82 with the copy pair management table 310. The first storage controller 40 is also able to change the pair status between the primary logical volume 81 and secondary logical volume 82 by receiving a command designating the pair operation (e.g., pair split or the like) from the backup server 30. The backup server 30 is able to designate the pair operation to the first storage controller 40 by writing a command designating such pair operation in the CMD 83. The pair operation of the backup server 30 will be described later in detail.

Figure 7:
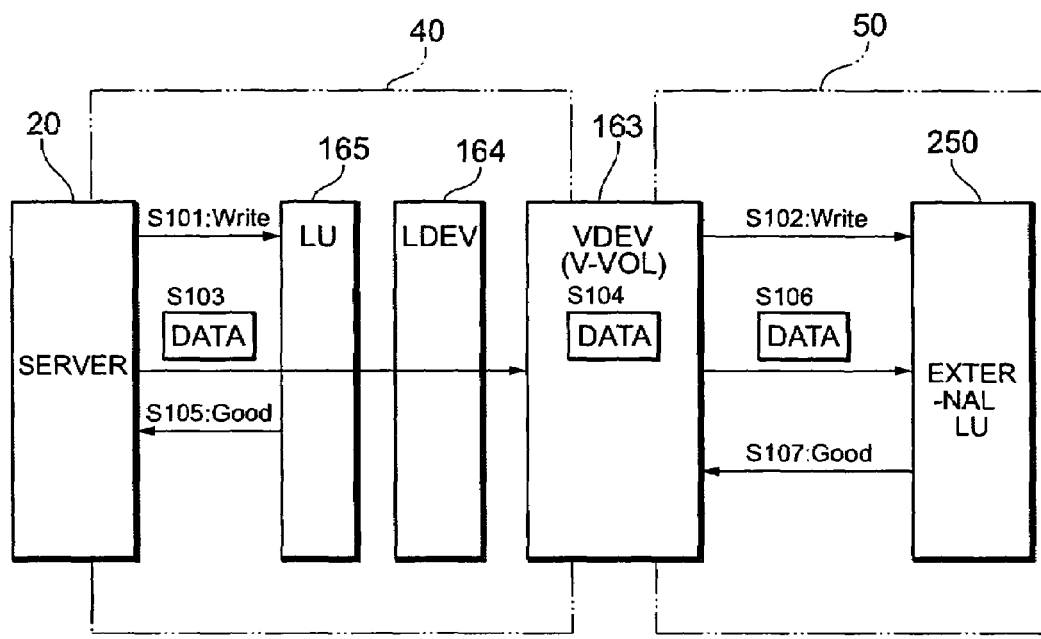
FIG. 7 is an explanatory diagram of the input and output of data between the first storage controller and second storage controller for performing synchronous copy between the primary logical volume and secondary logical volume.
Figure 8:
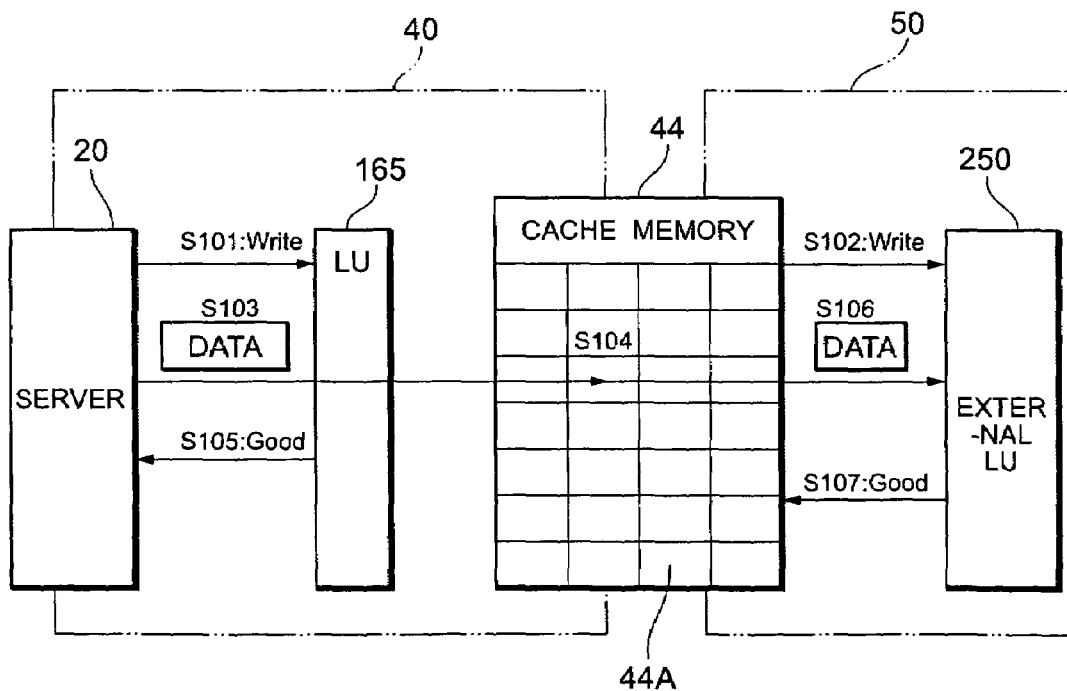
FIG. 8 is an explanatory diagram of the input and output of data between the first storage controller and second storage controller for performing synchronous copy between the primary logical volume and secondary logical volume.

Next, additional explanation is provided for the input and output of data between the first storage controller 40 and second storage controller 50 for performing the synchronous copy between the primary logical volume 81 and secondary logical volume 82 with reference to FIG. 6 to FIG. 8.

FIG. 7 and FIG. 8 show the flow of data during the write processing. FIG. 7 is a flowchart mainly showing the storage hierarchy, and FIG. 8 is a flowchart mainly showing how the cache memory 24 is used.

The business server 20 issues a write command by clarifying an LDEV number for specifying the LDEV 164 (primary logical volume 81) of the write destination, and a WWN for specifying the target port 42A to access the LDEV 164 of the write destination (S101).

When the first storage controller 40 receives a write command from the business server 20, it creates a new write command by changing the write destination address information and so on of the write command in accordance with the LU 250 in a mapping relationship with the external volume 91, and transmits this new write command to the second storage controller 50 (S102).

Next, the business server 20 transmits write data to the first storage controller 40 (S103). The write data received by the first storage controller 40 is written in the LDEV 164 (primary logical volume 81) of the write destination (S104), and forwarded to the LU 250 of the second storage controller 50 upon passing through the LDEV 164 and VDEV 163 (S106). Here, the first storage controller 40 transmits a write completion report to the business server 20 at the point in time when it stores the write data received from the business server 20 in the cache memory 44 (S105).

At the point in time the second storage controller 50 receives the write data from the first storage controller 20 (or at the time the write data is written in the external volume 91), it transmits a write completion report to the first storage controller 40 (S107). In other words, the timing of the first storage controller 40 reporting the completion of writing to the business server 20 (S105) and the timing of the data actually being written in the external volume 91 will differ. Therefore, the business server 20 will be freed from the data write processing before the data is actually written in the physical device 54, and may perform other processes.

Here, referring to FIG. 7, additional explanation is provided regarding how the cache memory 44 is used. Any redundant explanation is omitted. The cache memory 44 is provided with a plurality of sub blocks 44A. The first storage controller 40 converts the logical block address (LBA) designated by the business server 20 into an address of the sub block 44A, and stores write data in a prescribed address of the cache memory 44 (S104). The write data stored in the cache memory 44 is read by the first storage controller 40, and transmitted to the second storage controller 50 (S106). The foregoing VDEV 162 and V-VOL 163 are logical existences provided in the storage space of the cache memory 44.

FIG. 6 shows the schematic of the address conversion for performing the synchronous copy between the primary logical volume 81 and secondary logical volume 82. The business server 20 transmits write data to the target port 42A upon designating the LUN number (LUN#) and logical block address (LBA). The first storage controller 40 refers to the address conversion table (LU-LDEV-VDEV conversion table) 320, and converts an LDEV 164 address into a V-VOL 163 address. The address conversion table 320 is configured by associating the LUN number (LUN#) of the LU 165, the number (LDEV#) of the LDEV 164 corresponding to the LUN 165 and the maximum number of slots, and the number (VDEV#) of the VDEV 163 corresponding to the LDEV 164 and the maximum number of slots. As a result of referring to this address conversion table 320, the first storage controller 40 converts the address of write data (LUN#+LBA) transmitted from the business server 20 into the address (VDEV#+SLOT#+SUBBLOCK#) for the VDEV 101.

Next, the first storage controller 40 refers to the address conversion table 330, and converts an address for the VDEV 101 into an address to be addressed to the LUN 250 of the second storage controller 50. The address conversion table 330, for instance, is configured by associating the number (VDEV#) of the VDEV 101, initiator port (external port 42B) of the first storage controller 40, WWN of the target port 52 of the second storage controller 50, and the LUN of the LU 250. By referring to this address conversion table 330, the first storage controller 40 converts the address for the V-VOL 163 into an address for the second storage controller 50 (initiator port number#+WWN+LUN#+LBA). The address-converted data described above arrives at the target port 52 from the external port 42B via the access path 64, and is written in a prescribed address of the LDEV 240 accessible from the LU 250.

Figure 9:
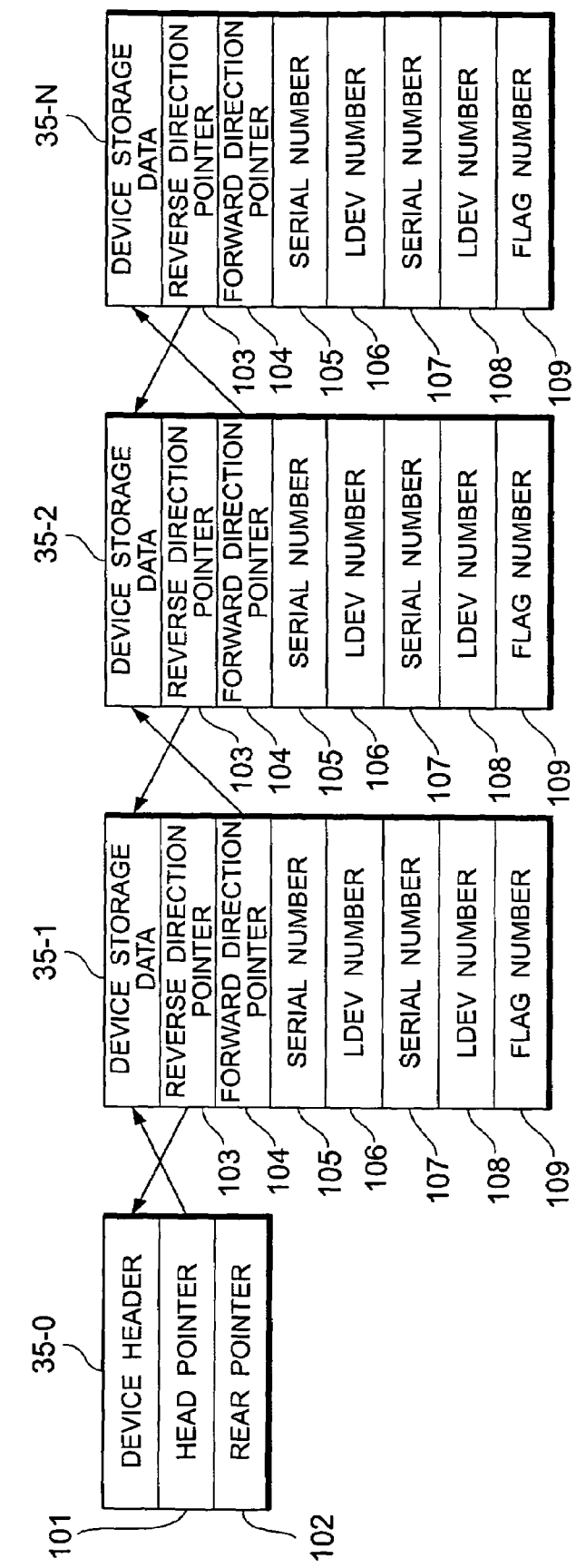
FIG. 9 is an explanatory diagram of the data structure of the device data.

FIG. 9 shows the data structure of the device data 35. The device data 35 is constituted from a device header 35-0, and N number of device storage data 35-1, 35-2, ..., 35-N. The device header 35-0 has a head pointer 101 for indicating the head of the device storage data 35-1, and a rear pointer 102 for indicating the rearmost device storage data 35-N. Each device storage data 35-1, 35-2, ..., 35-N has a reverse direction pointer 103 for indicating the forward device storage data, a forward direction pointer 104 for indicating the rear device storage data, a serial number 105 of the first storage controller 40, an LDEV number 106 of the secondary logical volume 82, a serial number 107 of the second storage controller 50, an LDEV number 108 of the external volume 91 mapped to the secondary logical volume 82, and flag information 109 for showing whether the external volume 91 is mapped to the secondary logical volume 82.

When the flag information 109 is "1", it shows that the external volume 91 is mapped to the secondary logical volume 82. When the flag information 109 "0", it shows that the external volume 91 is not mapped to the secondary logical volume 82. N is the same quantity as the number of secondary logical volumes 82. Each device storage data 35-1, 35-2, ..., 35-N is chain-connected bidirectionally with the reverse direction pointer 103 and forward direction pointer 104, and as a whole configure a single data chain.

When a plurality of first storage controllers 40 and secondary logical volumes 82 exist respectively, the combination of the serial number 105 and LDEV number 106 will enable the unique specification of the secondary logical volume 82. So as long as it is information that enables the unique specification of the secondary logical volume 82, this is not limited to the combination of the serial number 105 and LDEV number 106. For instance, in substitute for the LDEV number 106, a device file name of the secondary logical volume 82 may also be used.

Similarly, when a plurality of second storage controller 50s and external volumes 91 exists, respectively, the combination of the serial number 107 and LDEV number 108 will enable the unique specification of the external volume 91. So as long as it is information that enables the unique specification of the external volume 91, this is not limited to the combination of the serial number 107 and LDEV number 108. For instance, in substitute for the LDEV number 108, a device file name of the external volume 91 may also be used.

The device data 35 retains information showing which secondary logical volume 82 of which first storage controller 40 is mapped to which external volume 91 of which second storage controller 50, and whether such external volume 91 is under the control of the backup server 30. In other words, the storage management software 33 is able to determine, by referring to the device data 35, the mapping relationship of the secondary logical volume 82 and external volume 91, and whether the external volume 91 is under its own control.

FIG. 10 shows an example of the configuration file 36 to which the configuration information of the first storage controller 40 is described. In FIG. 10, port# represents the port number of the port 43A of the disk adapter 43. LU# represents the LUN of the secondary logical volume 82. The combination of the port# and LU# enables the unique specification of the secondary logical volume 82. Other configuration information described in the configuration file 36 is unrelated to the present embodiment, and the explanation thereof is omitted.

Figure 11:
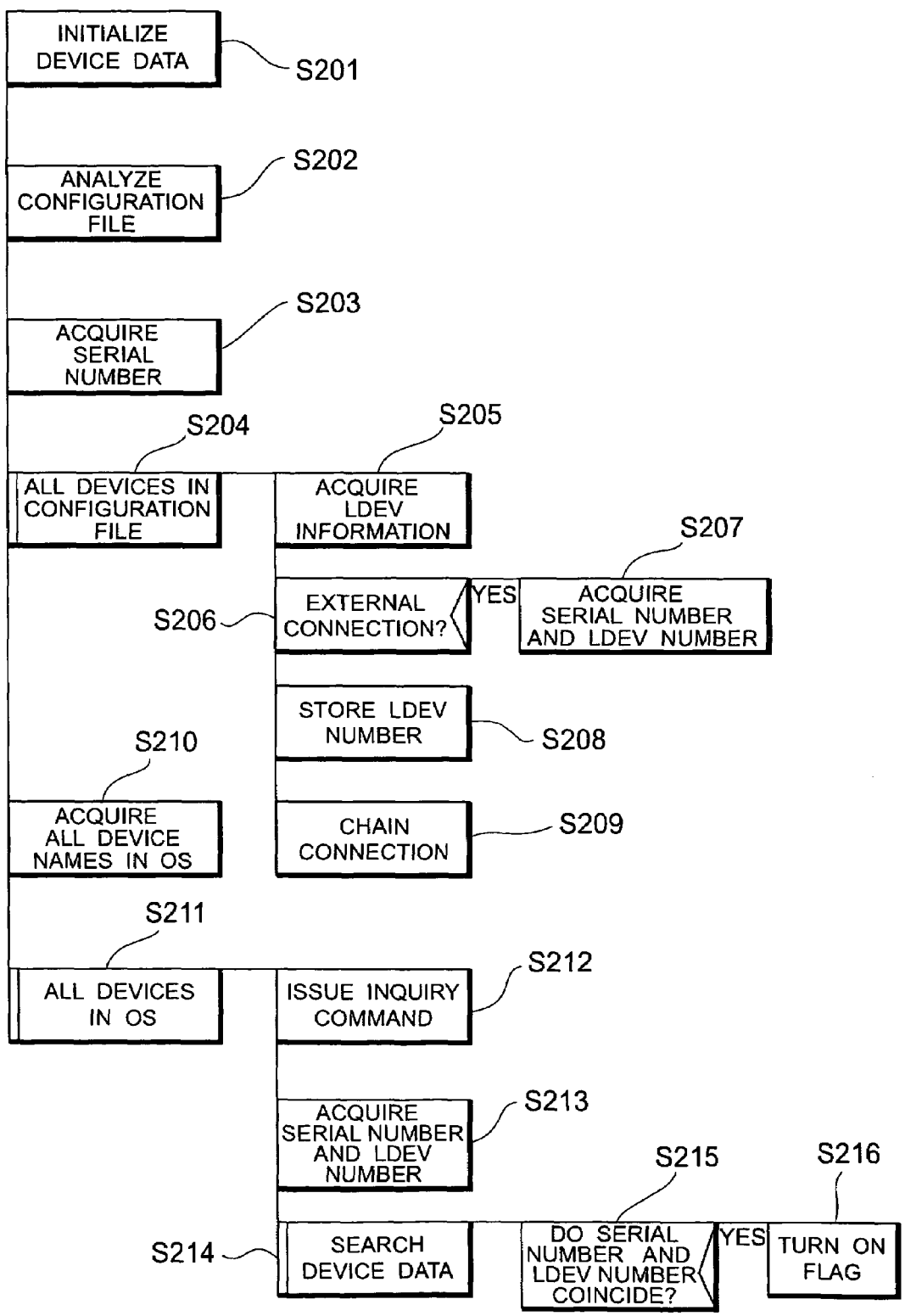
FIG. 11 is a flowchart showing the generation processing of device data.

FIG. 11 is a flowchart showing the processing for creating the device data 35. The storage management software 33 initializes the device data 35 when the system is activated (S201). As a result of initialization, the device data 35 will only possess the device header 35-0.

Next, the storage management software 33 analyzes the configuration file 36 (S202), and acquires the port# and LU# of the secondary logical volume 82.

Next, the storage management software 33 writes in the CMD 83 a command requesting the acquisition of the serial number of the first storage controller 40 having the secondary logical volume 82 corresponding to the combination of the port# and LU#. Then, as a result of the response to the command, the serial number of the first storage controller 40 is written in the CMD 83. The storage management software 33 accesses the CMD 83, and acquires the serial number of the first storage controller 40 (S203). The storage management software 33 stores the serial number of the first storage controller 40 in the serial number of each device storage data 35-1, 35-2, ..., 35-N.

Next, the storage management software 33 repeatedly executes the processes of S205 to S209 for the number of devices (secondary logical volume 82) described in the configuration file 36 (S204).

Next, the storage management software 33 writes in the CMD 83 a command requesting the acquisition of the mapping information with the LDEV number of the secondary logical volume 82 corresponding to the combination of the port# and LU#. Then, as a result of the response to the command, the LDEV number of the secondary logical volume 82 and the mapping information are written in the CMD 83. Mapping information includes the LDEV number of the external volume 91 having a mapping relationship with the secondary logical volume 82, the serial number of the second storage controller 50 having such external volume 91, and so on. The storage management software 33 access the CMD 83, and acquires the LDEV number of the secondary logical volume 82 and the mapping information (S205).

The storage management software 33 determines, based on the mapping information, the existence of an external volume 91 mapped to the secondary logical volume 82 (S206).

When an external volume 91 mapped to the secondary logical volume 82 exists (S206; YES), the storage management software 33 sequentially stores the serial number of the second storage controller 50 and the LDEV number of the external volume 91 in the serial number 107 and LDEV number 108 of each device storage data 35-1, 35-2, ..., 35-N (S207).

Next, the storage management software 33 sequentially stores the LDEV number of the secondary logical volume 82 in the LDEV number 106 of each device storage data 35-1, 35-2, ..., 35-N (S208).

Next, the storage management software 33 bidirectionally chain-connects each device storage data 35-1, 35-2, ..., 35-N with the reverse direction pointer 103 and forward direction pointer 104 (S209).

Next, the storage management software 33 acquires the device file name and physical drive name of the external volume 91 recognized by the operating system 32 from the operating system 32 (S210).

Next, the storage management software 33 repeatedly executes the processes of S212 to S216 for the number of devices (external volumes 91) recognized by the operating system 32 (S211).

Next, the storage management software 33 clarifies the device file name and physical drive name of the external volume 91, and issues to the second storage controller 50 an inquiry command requesting the acquisition of the serial number of the second storage controller 50 and the LDEV number of the external volume 91 (S212). Details of the inquiry command are defined in a SCSI protocol.

Next, the storage management software 33 acquires the serial number of the second storage controller 50 and the LDEV number of the external volume 91 by receiving the reply of the inquiry command (S213).

Next, the storage management software 33 searches the LDEV number 108 of each device storage data 35-1, 35-2, . . . , 35-N (S214), and, if there is a match with the LDEV number of the external volume 91 among the LDEV numbers 108 (S215), it sets the flag information 109 to "1" (S216). The device data 35 is completed through the foregoing processes.

When the backup software 34 receives a backup designation or restoration designation of the external volume 91 from the business server 20 or another host system (not shown), it makes an inquiry to the storage management software 33 regarding the existence of a mapping relationship of the external volume 91. When the storage management software 33 receives an inquiry from the backup software 34, it refers to the device data 35 and checks the existence of the mapping relationship of the external volume 91 and secondary logical volume 82. When a secondary logical volume 82 having a mapping relationship with the external volume 91 exists, the storage management software 33 writes in the CMD 83 a command designating the pair split of the primary logical volume 81 and secondary logical volume 82. Then, the first storage controller 40 reads the command written in the CMD 83, renews the copy pair management table 310, and changes the pair status between the primary logical volume 81 and secondary logical volume 82 to "pair split".

Incidentally, when backing up or restoring the data in the external volume 91 having a mapping relationship with the secondary logical volume 82, in substitute for the "pair split" of the primary logical volume 81 and secondary logical volume 82, or in addition to the "pair split" of the primary logical volume 81 and secondary logical volume 82, the cache memory 44 of the first storage controller 40 may be subject to a cache flush. For example, when the backup software 34 receives a backup designation or restoration designation of the external volume 91 from the business server 20 or another host system (not shown), it writes in the CMD 83 a command designating the cache flush of the cache memory 44. Then, the first storage controller 40 performs a cache flush to the cache memory 44. Thereby, it is possible to prevent the dirty data accumulated in the cache memory 44 from being written in the external volume 91 during the backup or restoration of data in the external volume 91. Further, if dirty data remains in the cache memory 44, the dirty data remaining in the cache memory 44 will be written in the secondary logical volume 82 when the backup server 20 accesses the secondary logical volume 82 after restoring the external volume 91, and, as a result, the consistency of data will be lost. Nevertheless, by subjecting the cache memory 44 to cache flush, this kind of inconvenience can be overcome.

According to the present embodiment, since the storage management software 33 of the backup server 30 retains the device data 35 showing the mapping relationship of the external volume 91 and secondary logical volume 82, it is possible to check the existence of a secondary logical volume 82 having a mapping relationship with the external volume 91 to be subject to backup or restoration. Further, when a secondary logical volume 82 having a mapping relationship with the external volume 91 to be subject to backup or restoration exists, the pair status between the primary logical volume 81 and secondary logical volume 82 is changed to "pair split", or the cache memory 44 is subject to a cache flush, in order to prevent the inflow of data form the secondary logical volume 82 into the external volume 91 during the backup or restoration of the external volume 91.

Embodiment 2

Figure 12:
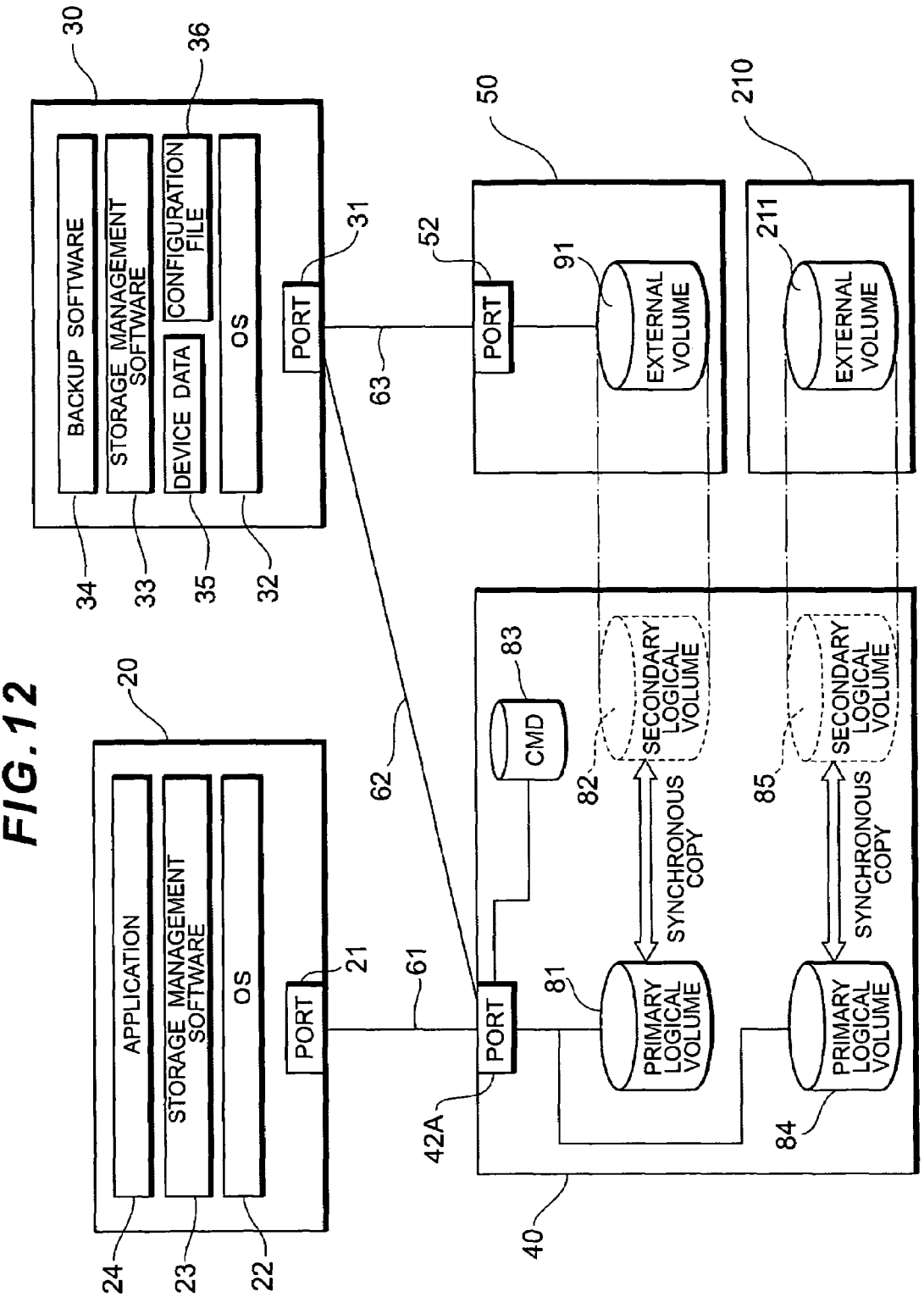
FIG. 12 is a system configuration of the storage system pertaining to Embodiment 2.

FIG. 12 shows the system configuration of a storage system 200 pertaining to the present embodiment. The systems and the like that are the same as those depicted in FIG. 1 are given the same reference numeral and the detail explanation thereof is omitted. The storage system 200 has a business server 20, a backup server 30, a first storage controller 40, a second storage controller 50 and a third storage controller 210. These servers 20, 30 and storage controllers 40, 50, 210 are mutually connected via a network (not shown).

The first storage controller 40, in addition to the first copy pair formed from the foregoing primary logical volume 81 and secondary logical volume 82, further has a second copy pair formed from the primary logical volume 84 and secondary logical volume 85. Meanwhile, the third storage controller 210 has an external volume 211. Although the external volume 211 is referred to as an external volume as a matter of convenience since it exists outside when viewed from the first storage controller 40, it is also an internal volume in the sense that it exists inside the third storage controller 210. The external volume 211 is mapped to the secondary logical volume 85.

Incidentally, the third storage controller 210 is connected to another backup server (not shown) other than the backup server 30.

The device data 35 retained by the storage management software 33 stores the following information:

(1) That the external volume 91 is mapped to the secondary logical volume 82;
(2) That the external volume 211 is mapped to the secondary logical volume 85;
(3) That the external volume 91 is under the control of the backup server 30; and
(4) That the external volume 211 is under the control of the backup server 30.

When the storage management software 33 receives a command designating the pair split of the copy pair of the first storage controller 40 from the backup software 34, it determines the adequacy of the pair split by referring to the device data 35. In the determination of the adequacy of the pair split, the following two points are verified. One is whether a mapping relationship exists between the external volume to be subject to backup or restoration and the copy pair to be subject to the pair split. The other is whether the external volume to be subject to backup or restoration is under the control of the backup server 30. When a mapping relationship between the external volume to be subject to backup or restoration and the copy pair to be subject to the pair split exists, and the external volume to be subject to backup or restoration is under the control of the backup server 30, the pair split is determined to be adequate.

For example, considered is a case where, as the preprocessing for performing the backup or restoration of the data in the external volume 91 under the control of the backup server 30, a designation of a pair split of the second copy pair formed from the primary logical volume 84 and secondary logical volume 85 is given from the backup software 34 to the storage management software 33. When the storage management software 33 confirms that there is no mapping relationship between the second copy pair formed from the primary logical volume 84 and secondary logical volume 85 and the external volume 91 by referring to the device data 35, it determines that the designation of a pair split is inadequate, and returns an error report to the backup software 34.

Figure 13:
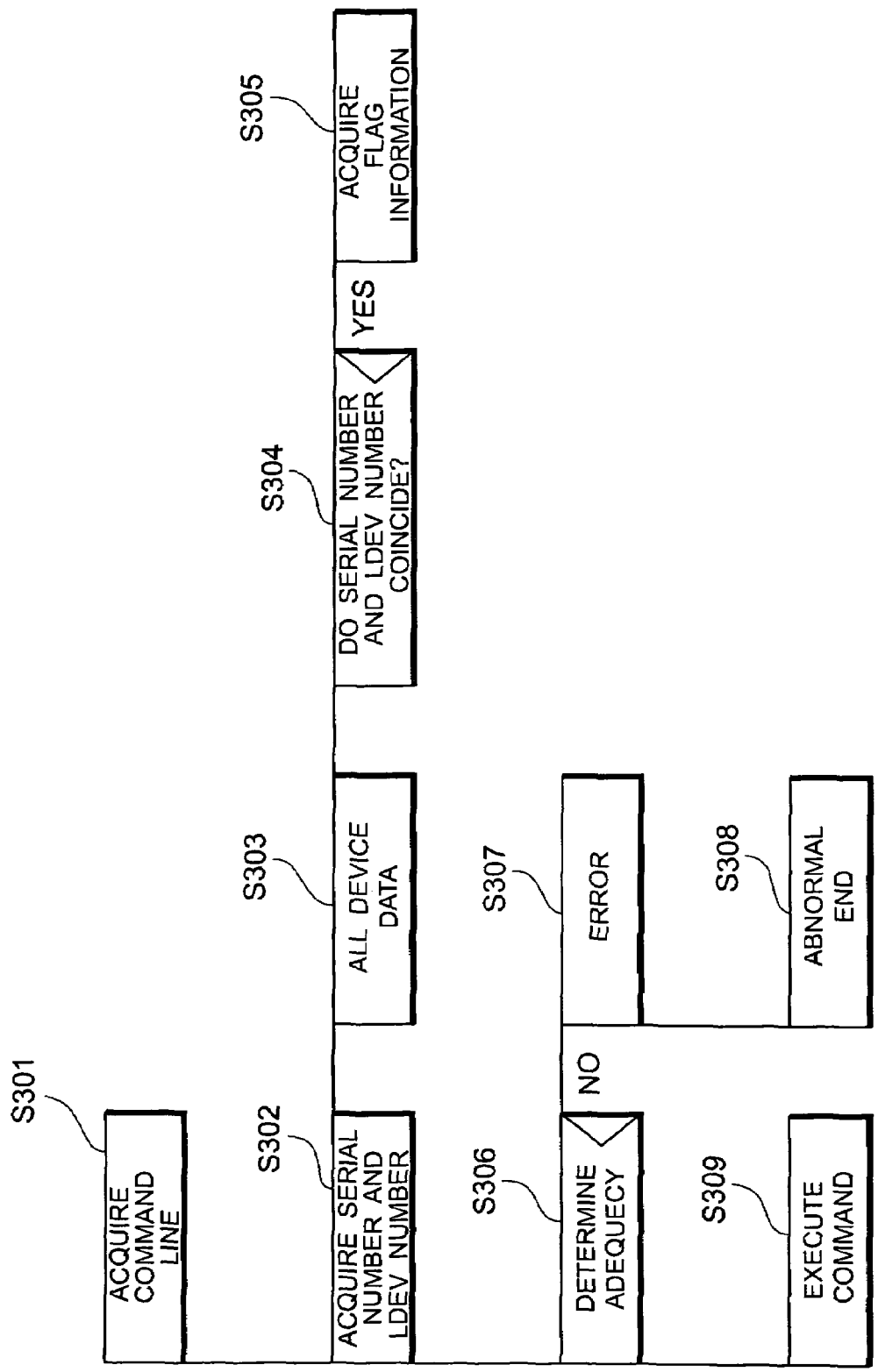
FIG. 13 is a flowchart showing the processing for determining the pair split adequacy.

FIG. 13 is a flowchart showing the processing for determining the adequacy of the pair split. When the storage management software 33 receives a command designating a pair split from the backup software 34 (S301), it acquires the LDEV number of a device to be subject to the pair split and the serial number of the storage controller having the device to be subject to the pair split (S302).

Next, the storage management software 33 repeatedly executes the processes of S304 to S305 for the number of chains of the device data 35 (S303).

Whether the LDEV number of the device to be subject to the pair split and the serial number of the storage controller having the device to be subject to the pair split coincide with the LDEV number 106 of each device storage data 35-1, 35-2, ..., 35-N is determined (S304), and, when they coincide, the flag information 109 is acquired (S305).

Next, the storage management software 33 determines the adequacy of the pair split based on the flag information 109 (S306).

When the storage management software 33 determines that the pair split is not adequate, it returns an error report to the backup software 34 (S307), and abnormally ends (S308).

Meanwhile, when the storage management software 33 determines that the pair split is adequate, it designates the pair split to the storage controller having the device to be subject to the pair split (S309).

According to the present embodiment, since the storage management software 33 is able to determine the adequacy of the pair split based on the device data 35, it is possible to prevent the erroneous pair split of the copy pair having no mapping relationship with the external volume to be subject to backup or restoration.

Embodiment 3

Figure 14:
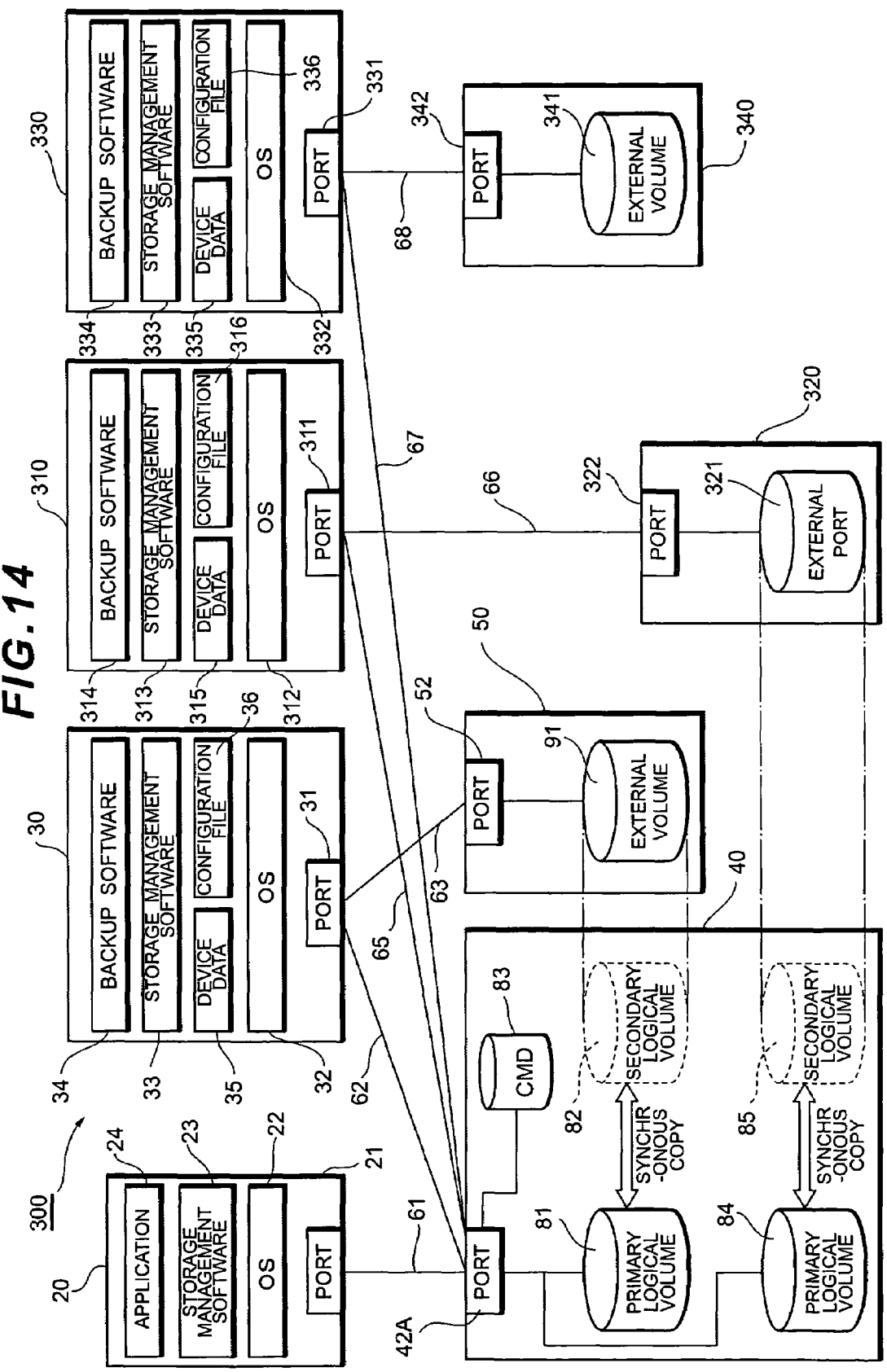
FIG. 14 is a system configuration of the storage system pertaining to Embodiment 3.

FIG. 14 shows the system configuration of a storage system 300 pertaining to the present embodiment. The systems and the like that are the same as those depicted in FIG. 12 are given the same reference numeral and the detail explanation thereof is omitted. The storage system 300 has a business server 20, a first backup server 30, a second backup server 310, a third backup server 330, a first storage controller 40, a second storage controller 50, a third storage controller 320 and a fourth storage controller 340. These servers 20, 30, 310, 330 and storage controllers 40, 50, 320, 340 are mutually connected via a network (not shown).

The second backup server 310 has a port 311, an operating system 312, a storage management software 313, a backup software 314, a device data 315 and a configuration file 316. Similarly, the third backup server 330 has a port 331, an operating system 332, a storage management software 333, a backup software 334, a device data 335 and a configuration file 336.

The third storage controller 320 has an external volume 321 and a target port 322. The external volume 321 is mapped to the secondary logical volume 85. The fourth storage controller 340 has an external volume 341 and a target port 342.

The port 311 and target port 42A are connected via an access path 65. The port 311 and target port 322 are connected via an access path 66. The port 331 and target port 42A are connected via an access path 67. The port 331 and target port 342 are connected via an access path 68.

In the present embodiment, when any backup server among the first backup server 30, second backup server 310 and third backup server 330 receives a backup designation or restoration designation from the business server 20 or another host system (not shown), it determines whether the external volume is an external volume under its own control by referring to the device data, and, when it is determined that such external volume is not under one's own control, it makes an inquiry to other backup servers regarding whether the external volume is under its control. Then, the backup server having such external volume under its own control executes the backup or restoration.

For example, considered is a case where the first backup server 30 receives a backup designation of the external volume 321 from the business server 20. When the storage management software 33 of the first backup server 30 receives a backup designation, it determines whether the external volume 321 is under its own control by referring to the device data 35. Since the external volume 321 is not under the control of the storage management software 33, the storage management software 33 makes an inquiry to the storage management software 313 of the second backup server 310 and the storage management software 333 of the third backup server 330 regarding whether the external volume 321 is under its own control. Since the storage management software 313 has the external volume 321 under its own control, the second backup server 310, on behalf of the first backup server 30, executes the backup of the external volume 321.

Figure 15:
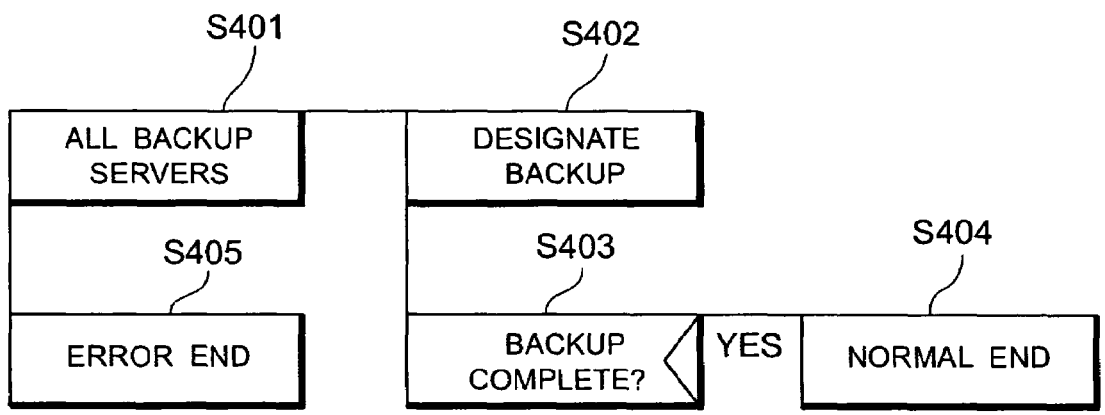
FIG. 15 is a flowchart showing the operation of a backup server which received a backup designation.
Figure 16:
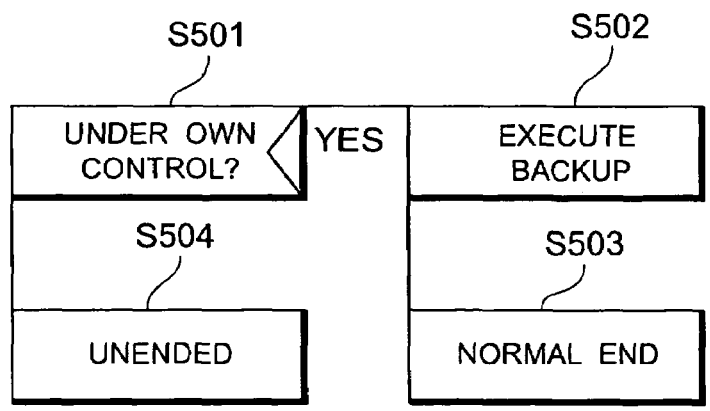
FIG. 16 is a flowchart showing the operation of a backup server which received a backup designation.

FIG. 15 and FIG. 16 are flowcharts showing the operation of the backup server that received the backup designation. When a backup designation is given to any backup server (S401), the processes of S402 to S404 are executed to all backup servers including the backup server that received the backup designation.

A backup designation is given to one of the backup servers (more precisely, to the backup software) (S402). Here, if the backup is complete (S403), the routine normally ends (S404). Meanwhile, when the backup is not possible with any of the backup servers, the routine abnormally ends (S405).

At S402, the subroutine of S501 to S504 are called. The backup software that received the backup designation makes an inquiry to the storage management software regarding whether the external volume to be subject to backup is under its own control (S501).

The backup software executes the backup when the external volume is under its own control (S502), returns a value representing normal end, and ends the routine (S503). Meanwhile, when the external volume is not under its own control, the backup software returns a value representing an incomplete backup, and ends the routine (S504).

According to the present embodiment, when the external volume to be subject to backup or restoration is not under the control of the backup server that received the backup designation or restoration designation, by the backup server that received the backup designation or restoration designation making an inquiry to the other backup servers, the backup server having such external volume under its own control is able to execute the backup or restoration.

We claim:

1. A storage system comprising a main server, a backup server, a first storage controller, a second storage controller, a third storage controller, and a network connecting among the servers and the controllers, wherein said first storage controller has first and second primary logical volumes each formed from an actual volume therein, and first and second secondary logical volumes each formed from a virtual volume selectively mapped to an external volume thereby forming a copy pair with one of said primary logical volumes, wherein said second storage controller has an actual volume therein which constitutes one of said external volumes selectively mapped to one of said secondary logical volumes, wherein said third storage controller has an actual volume therein which constitutes one of said external volume selectively mapped to one of said secondary logical volumes, wherein said backup server has device data showing whether a mapping relationship exists between said external volumes and said secondary logical volumes and whether said external volumes are controlled by the backup server, wherein a pair split of a copy pair, which consists of one of said primary logical volumes and one of said secondary logical volumes, is determined as adequate if a mapping relationship exists between said one secondary logical volume and said one external volume, and if said one external volume is controlled by the backup server, and wherein only when the pair split of the copy pair is determined as adequate, the copy pair is spitted thereby performing backup or restoration of said one external volume.

2. The storage system according to claim 1, wherein said backup server determines the mapping relationship between said external volumes and said secondary logical volumes by referring to said device data upon performing backup or restoration of said external volumes and, when it is determined that one of said external volumes is being mapped to one of said secondary logical volumes and said one external volume is controlled by the backup server, transmits to said first storage controller a command designating a pair split of said one secondary logical volume to which said one external volume is mapped and said primary logical volume.

3. The storage system according to claim 1, further comprising a cache memory for temporarily storing data to be read from and written into said secondary logical volumes, wherein said backup server determines the mapping relationship between said external volumes and said secondary logical volumes by referring to said device data upon performing backup or restoration of said external volume and, when it is determined that one of said external volumes is being mapped to one of said secondary logical volumes, transmits to said first storage controller a command designating a cache flush of a cache memory for temporarily storing data to be read from and written into said one secondary logical volume to which said one external volume is mapped.

4. The storage system according to claim 1, wherein said one external volume of said one secondary logical volume is not controlled by the backup server, the backup server refers to the main sever which controls said one external volume to transmit to said first storage controller a command designating a pair split of said one secondary logical volume to which said one external volume is mapped and said primary logical volume.

5. The storage system according to claim 1, wherein said one external volume of said one secondary logical volume is not controlled by the backup server, the backup server refers to the main sever which controls said one external volume to transmit to said first storage controller a command designating a cache flush of a cache memory for temporarily storing data to be read from and written into said secondary logical volume to which said one external volume is mapped.

6. The storage system according to claim 1, wherein said external volume is virtualized to the main server as an internal volume in said first storage controller.

7. A control method of a storage system including a main server, a backup server, a first storage controller, a second storage controller, a third storage controller, and a network connecting among the servers and the controllers, said first storage controller having first and second primary logical volumes each formed from an actual volume therein and first and second secondary logical volumes each formed from a virtual volume selectively mapped to an external volume thereby forming a copy pair with one of said primary logical volumes, said second storage controller having an actual volume therein which constitutes one of said external volumes selectively mapped to one of said secondary logical volumes, said third storage controller having an actual volume therein which constitutes one of said external volume selectively mapped to one of said secondary logical volumes, the method comprising the steps of:

determining whether a mapping relationship exits between one of said external volumes and one of said secondary logical volumes before performing the backup or restoration of said one external volume and whether said one external volume is controlled by the backup server; and transmitting to said first storage controller a command designating a pair split of said secondary logical volume to which said external volume is mapped and said primary logical volume, only if said external volume is being mapped to said secondary logical volume and if said one external volume is controlled by the backup server.

8. The control method according to claim 7, further comprising: virtualizing said external volume to the main server as an internal volume in said first storage controller.

9. A control method of a storage system including a main server, a backup server, a first storage controller, a second storage controller, a third storage controller, and a network connecting among the servers and the controllers, said first storage controller having first and second primary logical volumes each formed from an actual volume therein and first and second secondary logical volumes each formed from a virtual volume selectively mapped to an external volume thereby forming a copy pair with one of said primary logical volumes, said second storage controller having an actual volume therein which constitutes one of said external volumes selectively mapped to one of said secondary logical volumes, said third storage controller having an actual volume therein which constitutes one of said external volume selectively mapped to one of said secondary logical volumes, the method comprising the steps of:

determining whether a mapping relationship exits between one of said external volumes and one of said secondary logical volumes before performing the backup or restoration of said one external volume and whether said one external volume is controlled by the backup server; and transmitting to said first storage controller a command designating a cache flush of a cache memory for temporarily storing data to be read from and written into said secondary logical volume to which said external volume is mapped, only if said external volume is being mapped to said secondary logical volume and if said one external volume is controlled by the backup server.

10. A computer readable storage medium stored with a computer program for controlling a storage system including a main server, a backup server, a first storage controller, a second storage controller, a third storage controller, and a network connecting among the servers and the controller, said first storage controller having first and second primary logical volumes each formed from an actual volume therein and first and second secondary logical volumes each formed from a virtual volume selectively mapped to an external volume thereby forming a copy pair with one of said primary logical volumes, said second storage controller having an actual volume therein which constitutes one of said external volumes selectively mapped to one of said secondary logical volumes, said third storage controller having an actual volume therein which constitutes one of said external volume selectively mapped to one of said secondary logical volumes, said program comprising:

a module for determining whether a mapping relationship exits between one of said external volumes and one of said secondary logical volumes before performing the backup or restoration of said one external volume and whether said one external volume is controlled by the backup server; and a module for transmitting to said first storage controller a command designating a pair split of said secondary logical volume to which said external volume is mapped and said primary logical volume, only if said external volume is being manned to said secondary logical volume and if said one external volume is controlled by the backup server.

11. The computer readable storage medium according to claim 10, wherein the computer program further comprises: a module for virtualizing said external volume to the main server as an internal volume in said first storage controller.

12. A computer readable storage medium stored with a computer program for controlling a storage system including a main server, a backup server, a first storage controller, a second storage controller, a third storage controller, and a network connecting among the servers and the controllers, said first storage controller having first and second primary logical volumes each formed from an actual volume therein and first and second logical volumes each formed from a virtual volume selectively mapped to an external volume thereby forming a copy pair with one of said primary logical volumes, said second storage controller having an actual volume therein which constitutes one of said external volumes selectively mapped to one of said secondary logical volumes, said third storage controller having an actual volume therein which constitutes one of said external volume selectively mapped to one of said secondary logical volumes, said program comprising:

a module for determining whether a mapping relationship exits between one of said external volumes and one of said secondary logical volumes before performing the backup or restoration of said one external volume and whether said one external volume is controlled by the backup server; and transmitting to said first storage controller a command designating a cache flush of a cache memory for temporarily storing data to be read from and written into said secondary logical volume to which said external volume is mapped, only if said external volume is being mapped to said secondary logical volume and if said one external volume is controlled by the backup server.

\* \* \* \* \*